Aug. 7, 1956  M. R. THORBURN  2,757,574
BINOCULAR INSTRUMENTS
Filed Dec. 17, 1952  3 Sheets-Sheet 1

INVENTOR
MILTON R. THORBURN
BY Louis L. Gagnon
Noble J. Williams
ATTORNEYS

Aug. 7, 1956 M. R. THORBURN 2,757,574
BINOCULAR INSTRUMENTS
Filed Dec. 17, 1952 3 Sheets-Sheet 2

INVENTOR
MILTON R. THORBURN
BY Louis L. Gagnon
Noble S. Williams
ATTORNEYS

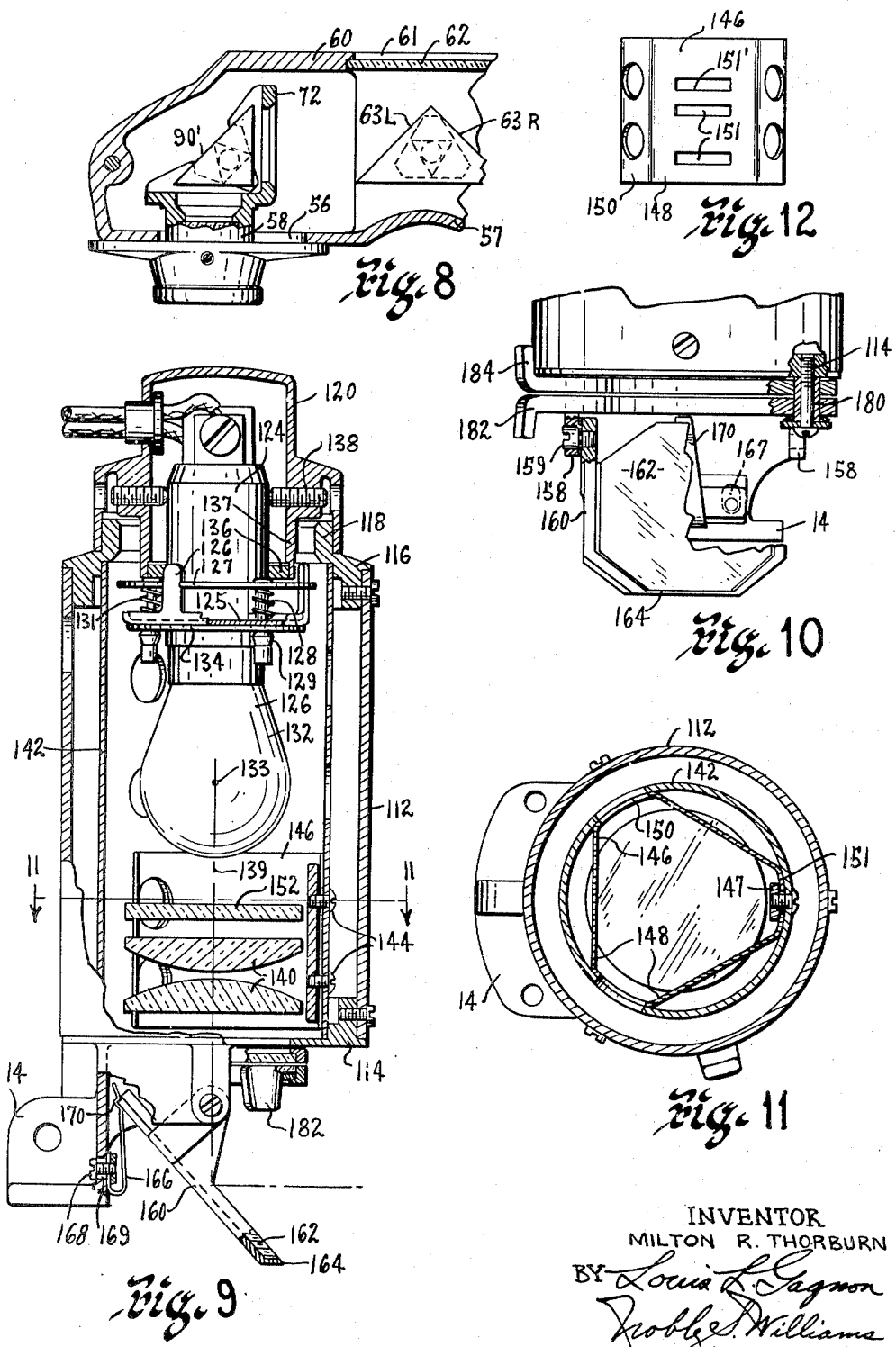

United States Patent Office 2,757,574
Patented Aug. 7, 1956

2,757,574

BINOCULAR INSTRUMENTS

Milton R. Thorburn, Williamsville, N. Y., assignor to American Optical Company, Southbridge, Mass., a voluntary association of Massachusetts Application December 17, 1952, Serial No. 326,451

7 Claims. (Cl. 88—39)

This invention relates to optical instruments and more particularly to an optical instrument of a binocular type arranged to be supported upon the head of a doctor, technician or the like thereof and in proper position before the eyes of the user thereof and provide with an illumination system for lighting objects to be viewed through the instrument.

It is recognized that head supported binocular viewers, magnifiers and the like are known, but the present invention is directed to improvements in the construction and arrangement of the parts of such an instrument and in the supporting means therefor whereby the instrument housing may be securely and comfortably carried upon the user's head, may be easily adjusted into proper position before the user's eyes for binocular viewing of an object or objects, and may be provided with an illumination system for directing a concentrated beam of light onto the object along nearly the same path as the line of sight of the instrument. The instrument is provided with means for allowing movement of the instrument housing and the illumination system from their operative position relative to the eyes of the user to an inoperative position when unobstructed vision is desired, and thereafter back to their operative position without need for realignment or readjustment. The instrument is provided with a susbtantially sealed-in dustproof housing or body for the optical components of the binocular system thereof, means for accommodating the interpupillary requirements and ophthalmic requirements of the user, means providing easy and accurate alignment of the optical components of the binocular system and means for accurately maintaining such alignment of components while certain of said components are being moved for interpupillary adjustment. The illumination system comprises a vertically disposed housing, a readily centerable concentrated light source and condenser elements therein and a reflector beneath the housing for directing the illumination beam from the system forwardly toward the object being viewed. Spacing and supporting means of an improved type are provided within the vertical housing for properly positioning and aligning the condenser elements therein while allowing a maximum of circulation of cooling air to flow through the illumination system. An additional improvement resides in the mounting arrangement for the reflector beneath the vertical housing which allows movement of the reflector away from its normal position when forcefully contacted by any object. The improved instrument and illumination system are of a sturdy, compact and light weight construction; conditions which are very desirable in an instrument of the type being described.

It is, accordingly, an object of the present invention to provide improved head supported means for supporting an instrument securely and comfortably before the eyes of a user thereof.

It is a further object of the invention to provide improved means for adjustably mounting such a binocular instrument upon the supporting means in such a manner that it may be readily adjusted into proper operative position before the eyes of the user and securely maintained in proper adjustment, and may be readily moved out of such operative position for unobstructed vision when desired, and thereafter returned to this position readily and without requiring realignment thereof.

It is an additional object of the invention to provide for a binocular head supported instrument a sealed-in, dust-proof housing arrangement and suitable means therein for allowing inter-pupillary adjustment of eye lens systems of the instrument as well as convenient means for securing the parts in proper adjustment.

It is another object of the invention to provide in such a binocular instrument a three point supporting and guiding arrangement for allowing for inter-pupillary adjustment of the eye lens and reflecting elements aligned therewith, and which arrangement is readily and conveniently accessible to the user of the instrument.

It is an additional object of the invention to provide in such a binocular instrument improved means for mounting and accurately adjusting reflecting elements within the housing of the instrument.

It is an additional object of the invention to provide in such an instrument readily interchangeable accommodation lenses which may be easily inserted by the person intending to use the instrument.

It is an additional object of the invention to provide with such a head supported instrument illumination means which is of light weight, sturdy compact construction and which is arranged so as to direct a concentrated beam of light along a predetermined path as well as to operate at a relatively cool temperature.

An additional object of the invention is to provide for such a binocular head supported instrument equipped with an illumination system suitable reflector mounting means associated with the illumination system and arranged to be disposed closely adjacent the binocular line of slight extending forwardly of the instrument, said reflector having pivotal and spring detent means allowing movement of the reflector, when necessary, out of its normal position.

Other objects and advantages of the invention will become apparent from the detailed description which follows when taken in conjunction with the accompanying drawing in which:

Fig. 8 is a fragmentary, sectional view taken substantially on line 8—8 of Fig. 4 and looking in the direction of the arrows;

Fig. 9 is a fragmentary, sectional view taken substantially on line 9—9 of Fig. 2 and looking in the direction of the arrows;

Fig. 10 is a fragmentary view of a portion of the structure of Fig. 9;

Fig. 11 is a sectional view taken substantially upon line 11—11 of Fig. 9 and looking in the direction of the arrows; and Fig. 12 is a side view of supporting means for the condenser elements of the illumination system.

Figure 1:
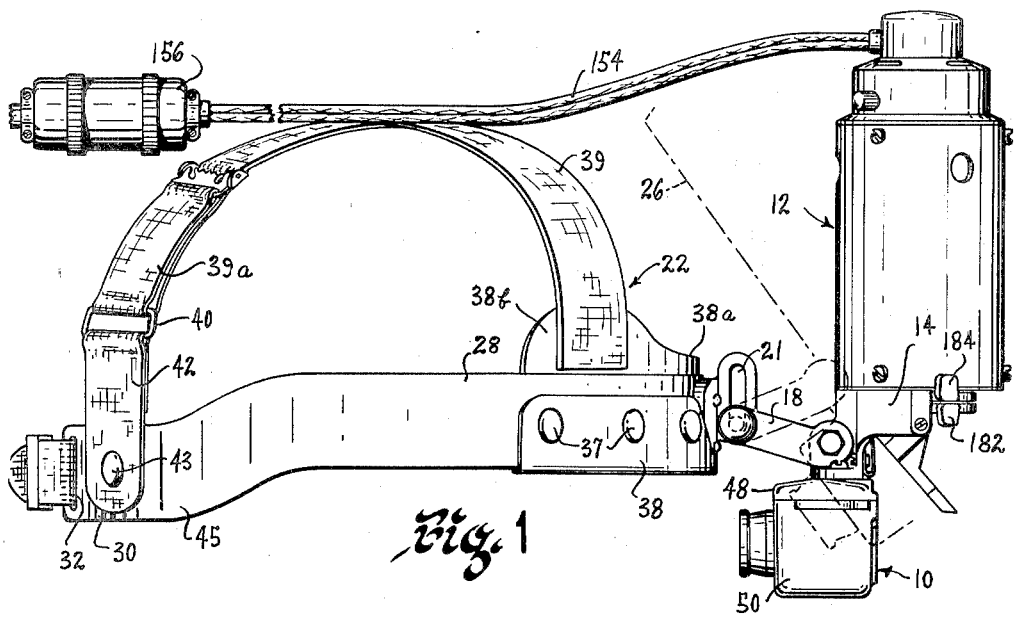
Fig. 1 is a side elevational view of a binocular instrument, illumination system and supporting means therefor embodying the present invention.
Figure 2:
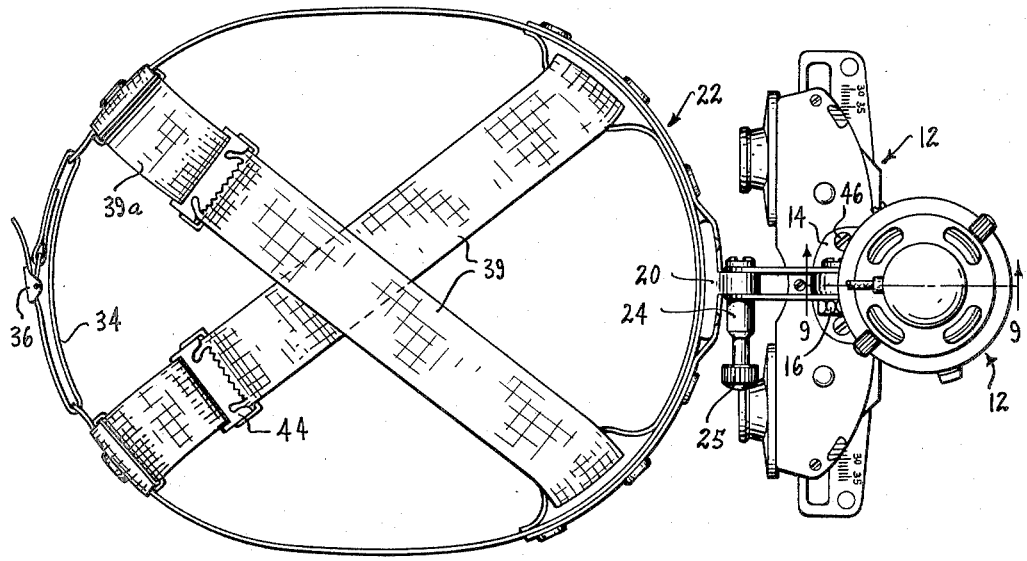
Fig. 2 is a plan view of the structure shown in Fig. 1.

Referring to the drawing in detail and particularly Figs. 1 and 2, it will be seen that a binocular instrument, which may be a binocular magnifier, binocular ophthalmoscope, binocular retinoscope or the like, is indicated generally by the numeral 10 and associated therewith is an illumination system 12. The illumination system and the binocular instrument are fixedly secured to spaced portions of a rigid specially shaped supporting bracket 14 which is in turn pivotally mounted at 16 upon a pair of spaced upwardly and rearwardly extending connecting links 18. The opposite free ends of the links 18 are positioned upon opposite sides of a vertically slotted bracket 20 which is fixedly carried upon a forward portion of a supporting means generally indicated at 22. Associated with the links 18 is readily operable pivotal clamping means 24 which extends through the links and through a slot 21 in bracket 20 and this clamping means may be loosened when desired to allow proper elevating of the links 18 relative to the bracket 20 or proper angular adjustment thereof. Thereafter knob 25 of clamping means 24 may be secured firmly in a locking position so as to maintain the desired adjustment.

On the other hand, the pivotal connection at 16 between the forward ends of the links 18 and bracket 14 is a frictional connection and is such that it may be properly tensioned to yieldably hold the bracket 14 and parts carried thereby in any set position. Thus the binocular instrument 10 and illumination system 12 may be readily positioned vertically and forwardly and rearwardly, as required, into proper relationship before the eyes of the wearer and thereafter easily secured in such position. When desired they may be swung or pivoted about the connection 24 to an out-of-the-way position as indicated by dotted lines 26 by merely pressing the instrument 10 upwardly. It will be readily appreciated that such pivoting of the parts may be effected without disturbing the adjustment provided by the parts 14, 16 and 18.

It will be readily appreciated that considerable weight is present in such an organization embodying a binocular viewer and illumination system therefor, even though the parts are made as light weight as possible, and when mounted upon a forward central portion of the supporting means 22 will provide considerable pressure upon the forehead of the user if the weight is not properly distributed. Poor distribution of weight might even interfere with the vision of the user. The supporting means generally indicated at 22 is arranged to distribute the weight being supported thereby over a considerable part of the user's head. The construction of the supporting means embodies a relatively wide flexible main supporting headband 28 of fibre or the like to which the bracket 20 is riveted or otherwise secured and this headband is in the general shape of an open oval having at the rear end portions 30 thereof slots 32 for receiving an adjustable fabric or plastic strap 34 provided with adjustment buckles 36 of known form.

Secured to the forward side of the headband 28 by several snap fasteners 37 is a wide flexible fabric or plastic strap 38 which extends beneath the headband 28 and upwardly upon the rear side thereof to provide a central forehead engaging portion 38a and attachment areas 38b. A pair of straps 39 of similar flexible material is secured to these areas 38b and extend diagonally in crossing harness-like relation over the head of the wearer and have connections at the looped rear ends 39a thereof with a pair of metal loops 40 carried by short fabric or plastic straps 42. The short straps 42 are anchored by snap fasteners at 43 near the rear end portions of the headband 28. The looped ends 39a of the straps 39 may be lengthened or shortened by adjustable buckles 44. It has been found that when proper adjustment of the diagonal straps 39 is accomplished by buckles 44 or the like, a considerable amount of the weight communicated to the forward part of the head band 28 may be distributed by these flexible fabric or plastic parts 38, 39 and 42 to a large area of the head of the user. The headband 28 has its rear ends "offset" or "lowered" somewhat at 45 as is clear from Fig. 1 in order to more snuggly fit the head of the wearer or user and accept the pull of the straps 39 without discomfort. Since the portion of the flexible strap 38 rearwardly of the stiff headband 28 is relatively wide and is free to extend upwardly and rearwardly from the lower edge of the headband, it will readily conform to the contour of the wearer's forehead and provide a very comfortable fit. The flexible parts 38, 39 and 42 are detachable for cleaning and replacement purposes.

The binocular instrument 10 is secured to the bracket 14 by screws or the like 46 threaded into a cover portion 48 of the instrument housing and this cover portion is in turn connected to the main housing 50 of the instrument by a central screw 52 and side screws 54. It will be seen by reference to Figs. 3, 4, 7 and 8 that the main housing 50 is arranged with a pair of elongated openings 56 in its rear vertical wall 57 through which extend movable tubular housings 58 carrying right and left hand eye pieces 59R and 59L respectively.

Figure 3:
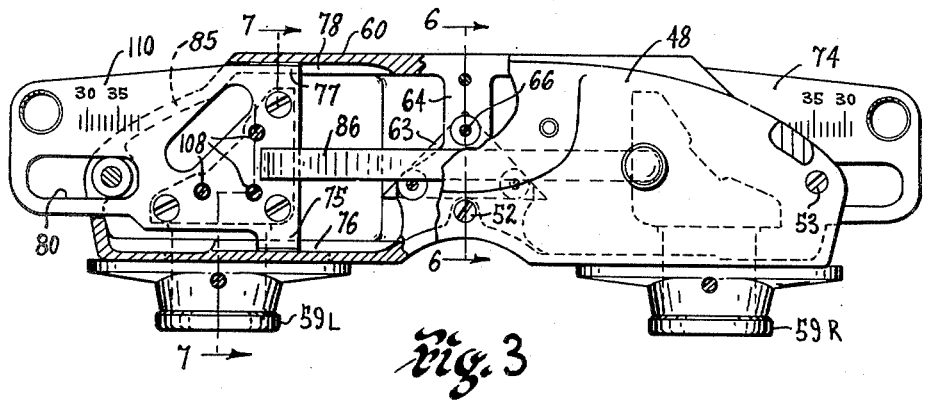
Fig. 3 is a an enlarged plan view, partly broken away and partly in section, showing the binocular instrument.

Centrally located in a front wall 60 of the housing 50 is an opening 61 closed by a window 62 and aligned therewith is a combining reflecting prism 63, see Figs. 3 and 8, having reflecting surfaces 63L and 63R. The upper part of the main housing section 50 is open except for a central reinforcing web 64 which is made of sufficient transverse width to accommodate aligning and adjusting screws 66 threaded therethrough and engageable with the combining prism 63 near the three corners thereof. The lower wall 67 of the housing section 50 is raised slightly at 68 so as to provide a seat 69 supporting a flat equal sided triangular leaf spring 70 which is centrally raised somewhat and is located beneath the center of the combining prism 63. Thus the adjusting screws 66 may press the prism downwardly against the resilient action of the spring 70 while the prism is being adjusted by the screws into proper alignment. Preferably, after alignment has been obtained a suitable slow setting plastic cement may be injected between the prism and the web 64 and between the prism and the raised lower wall portion 68 for more or less permanently securing the prism 63 against movement.

Each tubular housing 58 is an integral part of a frame-like structure 72 (see Figs. 4 and 8) which is secured by screws 73 to and carried by a lateral shiftable plate or slide 74. Each slide has what may be termed a three-point guiding and supporting arrangement which is accomplished by one inner corner 75 of the slide 74 having sliding engagement upon a rear guideway 76 formed in an upper portion of the rear wall of the housing 50. The slide 74 has its forward inner corner 77 in sliding engagement with a similar guideway 78 formed in the upper forward wall of the housing 50. The opposite or outer end of the slide 74 is provided with an elongated slot 80 arranged to receive a guide bushing 82 pressed into a cavity in the upper end wall 83 of the housing 50, said bushing being of a diameter at the upper flanged portion thereof so as to closely fit the width of the elongated slot and accordingly serve as a third guide means for the slide 74. A side screw 53 for the cover 48 extends through each bushing 82 and has threaded engagement with the housing 50.

The upper edge of each side wall 83 of the housing 50 is recessed at 84 to accommodate and closely fit the outer end of a slide 74 and the flat surface 85 serves as a support for the slide 74, and in order to assure smooth sliding action with freedom from looseness or the like, a double cantilever leaf spring is provided at 86. The spring is centrally secured to the cover 48 and has its opposite free end portions in slidable pressing engagement with a slide 74. A thumb screw 88 is provided in the cover 48 above each free end of the spring 86 and serves, when tightened, as means for firmly holding the associated slide 74 against lateral movement.

Figure 4:
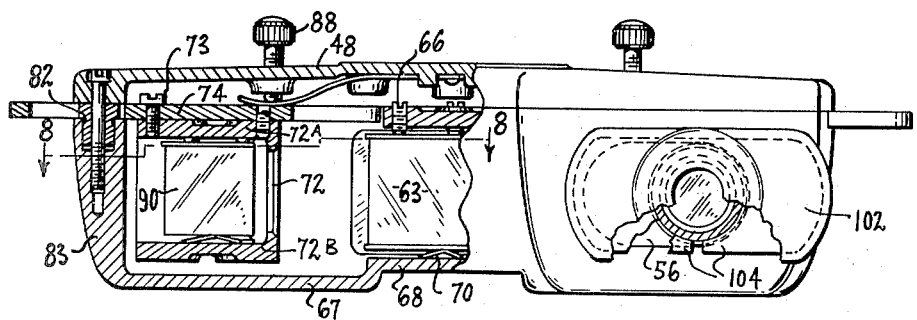
Fig. 4 is an elevational view, partly in section and partly broken away, of the instrument of Fig. 3.
Figure 5:
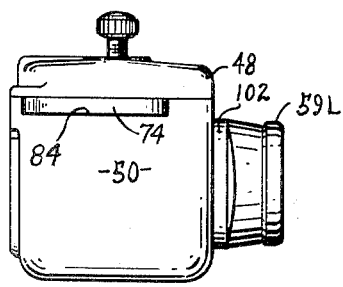
Fig. 5 is a side elevational view thereof.
Figure 6:
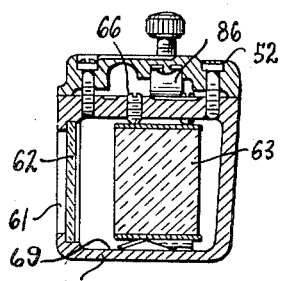
Fig. 6 is a sectional view taken substantially upon line 6—6 of Fig. 3 and looking in the direction of the arrows.
Figure 7:
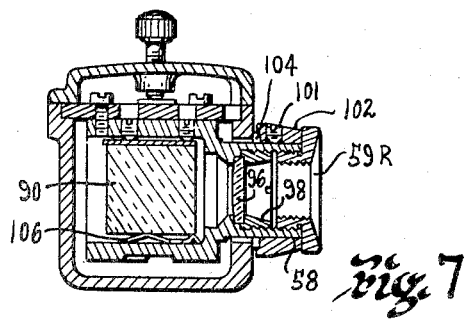
Fig. 7 is a sectional view taken substantially upon line 7—7 of Fig. 3 and looking in the direction of the arrows.

Each slide 74, as previously stated, carries a frame-like structure 72 and each structure 72 not only integrally supports a tubular housing 58 but also forms a housing for a reflecting prism 90 between upper and lower wall portions 72A and 72B thereof. The tubular housing 58 extends rearwardly from the structure 72 and has its axis substantially aligned with the center of the reflecting surface 90' of prism 90. Surface 90' is at the same time optically aligned (see Fig. 8) with the reflecting surface 63L of prism 63. Within this tubular extension 58 an optical element 96 is seated in a suitable recess and maintained therein by a retaining ring 98 screw threaded into the tubular member. When desired this optical element 96 may be a lens of suitable dioptic power to provide the user of the instrument a proper accommodation for his particular binocular vision. At certain times this element 96 may be merely a window for dust-proofing purposes. The eyepiece 59L is also screw threaded into the tubular housing. Secured at 101 to the outer surface of the tubular housing 58 is a lateral elongated shield 102 which serves to close at all times the associated elongated opening 56 provided in the rear wall of the housing portion 50 and in order that dust will be excluded from entering the interior of the housing a pair of yieldable felt gaskets 104 or the like are provided between the recessed rear surface 101 of the shield 102 and the adjacent wall surface of the housing 50, as best shown by Figs. 4 and 7. Obviously, each gasket is of considerable length in order to provide a sealing effect for the shield 102 for all positions of adjustments thereof.

The prism 90 may be secured within the frame-like structure 72 by means similar to that provided for combining prism 62. As shown in Figs. 3, 4 and 7, this means employs a centrally raised triangularly shaped leaf spring 106 centrally beneath the prism 90 and resting upon the lower wall 72B three spaced aligning and adjusting screws 108 extending through the upper wall 72A and engaging the prism. When desired metallic plates may be cemented to the upper and lower surfaces of any or all of the prisms. After each prism 90 has been properly aligned and adjusted with reference to the lens or window at 96 and to the reflecting surface 63L or 63R of the combining prism 63, the prisms 90 may be similarly substantially permanently secured in place by use of a slow setting plastic cement or the like.

Suitable graduations as indicated at 110 may be provided upon the slides 74 and index marks to function therewith provided upon the cover plate 48 for indicating equal amounts of displacement of the slides from the center line of the instrument, and accordingly, these marks may serve as an indication of the PD adjustment for the user of the instrument. A correct PD adjustment is very desirable when a lens is used at 96.

The optical system of Figs. 3, 4, 6, 7 and 8 provides means for combining the binocular vision of the user into two closely positioned beams extending forwardly from the instrument, such as might be used in conjunction with an auxiliary field lens (not shown) having a relative long rear focal distance and relatively short front focal distance so as to form together an indirect binocular opthalmoscope type of instrument. The instrument might easily be made to function as a binocular magnifier, if desired, by the simple expedient of using a negative lens at 96 and a plano-convex lens of suitable power to function therewith of proper size and shape to overlie the inner surface of the central window 62 and cemented thereto.

The illumination system 12, previously mentioned, preferably comprises an outer cylindrical housing 112 which is secured to a lower circular plate 114 carried by the supporting bracket 14. A circular plate 116 is secured at the upper end of the cylindrical housing 112 and may receive upon an upper flnaged portion thereof 118 a removable cap or closure member 120 within which is carried a cylindrical lamp socket 124. The socket is provided with a circumferential plate 125 fixedly surrounding its lower end and a plurality of guide fingers 126 extend upwardly from the flanged peripheral edge of this plate. A floating ring 127 loosely encircles the socket above the plate 125 and has notched edge portions for vertical guiding engagement with fingers 126. A plurality of pins 128 are carried by ring 127 and extend through holes in plate 125 and have enlarged lower ends 129. Each pin is surrounded by a coil spring 131. The springs constantly urge the ring 127 and pins 131 upwardly and thus a prefocused bulb 132 having a relatively small concentrated filament 133 and a conventional keyhole slotted positioning flange 134 may be securely held in the socket 124 by the pins 128 in known manner. A split ring 136 surrounds and frictionally engages the cylindrical wall of the socket 124 and is snugly received in a recess in the lower edge of a flange 137 of closure member 120. Ring 136 serves the purpose of maintaining the adjacent part of socket 124 in position while aligning screws 138 carried by the closure member are being adjusted to accurately optically align the filament 133 with the optical axis 139 of and at a suitable distance from a pair of condenser lenses 140.

An inner cylindrical wall or partition 142 is carried within recessed portions of the upper and lower members 114 and 116 so as to be in spaced relation to outer wall 112. The partition 142 has securing bolts 144 extending through holes therein and through a vertical slot formed by the spaced opposite ends of a condenser mount 146 and the ends of the bolts are threaded into a bar 147 in a manner for allowing axial adjustment of the mount relative to filament 133 after which the bolts may be tightened to retain the mount in proper relation to the filament.

As best seen by Figs. 9, 11 and 12 the condenser mount is in the form of a thin strip or sheet of metal bent along predetermined lines to provide three straight sidewall portions 148 interconnected by a pair of arcuate portions 150. The opposite ends 151 of the strip are also arcuately bent as shown in Fig. 11. The arcuate portions of the strip having sliding engagement with the interior surface of the cylindrical partition 148. Each straight sidewall portion 148 has suitable perforations 151 lanced therein to accommodate edge portions of the condenser lenses 140 in predetermined spaced relation as well as a perforation 151' to receive the edge of a heat absorbing element 152. Ventilation openings may be provided, if desired, in the arcuate portions 150 and in the partition 142. Since the diameters of the condenser lenses and the heat absorbing elements are materially less than the interior diameter of the partition 142 a maximum amount of free space between the outer wall 112 and partition 142 and between these optical members and the partition 142 is provided for cooling purposes. Ventilation openings may also be provided in the outer wall 112, when desired, but preferably not on the forward side thereof.

An electric cord 154 for supplying current to the lamp 132 may extend rearwardly from cap 120 and if desired suitable attachment means may be provided to secure the cord to the flexible straps 39 adjacent their intersection. Preferably, a light weight detachable connector 156 (see Fig. 1) may be provided for the cord 154 a short distance rearwardly of the intersection to provide the user of the instrument with a maximum amount of freedom by being able to disconnect the illumination system from the current supply cord when desired.

Carried upon spaced side projection 158 (see Fig. 10) of the bracket 14 is a pair of aligned pivots 159 (only one being shown) for hingedly supporting a frame 160 in which is mounted a reflector 162 for directing a beam of light rays from the light source forwardly toward the object to be observed or toward a field lens of an indirect ophthalmoscope, as previously mentioned. Since the lower forward edge 164 of this frame and reflector 162 are very much exposed, it is possible that this edge might be struck by an object and be injured thereby. Obviously, the forward edge of the reflector should be as close to the lines of sight of the binocular instrument as conveniently possible, and accordingly this edge is vulnerable. For this reason, suitable detent means is provided at 166 in the form of a leaf spring having openings 167 for receiving securing means 168 which extend also through vertical slots 169 in the bracket 14 so that the detent may be adjustably secured relative to the bracket 14. The spring 166 has an indented portion 170 engaging a rear corner of the frame 160. The indented portions 170 are arranged in substantially tangential relation relative to the arc of swing of this rear edge corner, and accordingly whether the reflector and frame are pressed forwardly or rearwardly the spring 166 will yield and release the reflector for free pivotal movement. On the other hand, when the mirror is moved back to its proper operative position, the indented portion will snap into place and retain the reflector in position for use. Mounted upon a pivot 180 carried by lower plate 114 may be pivotally carried a pair of filter holders 182 and 184 which are arranged to be either positioned in the beam of light being projected downwardly from the condenser elements 140 or forwardly to positions out of the beam, as conditions may require.

It should be noted that most of the structural parts of the binocular instrument illuminating system and supporting means may be made out of strong light weight material such as magnesium or plastic.

Having described my invention, I claim:

1. An optical instrument of the binocular type comprising a hollow housing arched over the nose of the observer and provided with a pair of laterally elongated openings for receiving eye tubes, a pair of laterally adjustable members within said housing having slidable engagement with guideways in said housing, a supporting frame carried by each of said members and carrying an eye tube so as to project through said elongated openings, a reflector carried by each of said supporting frames in alignment with said eye tube, an eyepiece carried by each eye tube, a central opening in a front wall of said main housing section, reflecting means centrally disposed within said housing rearwardly of said central opening, said reflecting means being disposed in said housing so as to receive light rays from an object point a predetermined distance forwardly of said instrument entering said housing through said opening and divide and direct said light rays laterally along separate optical paths toward the reflectors carried respectively by said supporting frames, transparent means adjacent said eyepieces and said central opening for closing said housing to dust and the like, and shielding means surrounding each eye tube and disposed between each eye tube and the adjacent portions of the rear wall of the housing arranged to prevent the infiltration of dust or the like into said housing.

2. An optical instrument of the binocular type comprising a hollow housing formed by a main housing section and a cover section removably secured thereto, laterally extending guideways within said housing, a pair of laterally adjustable members within said housing and having end portions extending outwardly of said housing through apertures formed in opposite side wall portions thereof, said members having inner widely spaced portions arranged in slidable engagement with said guideways, an accurately formed guide slot in each of said members, guide means carried by each side wall portion and extending through and accurately fitting each of said slots for accurately guiding the member associated therewith during lateral movement thereof, a supporting frame carried by each of said members and having a tubular projection extending rearwardly therefrom, a reflector carried by each of said supporting frames in alignment with the tubular projection carried thereby, a pair of laterally elongated openings in the rear wall of said main housing section through which said tubular projections extend, eyepieces carried by each tubular projection, a central opening in a front wall of said main housing section, reflecting means centrally disposed within said housing rearwardly of said central opening, said reflecting means being disposed in said housing so as to receive light rays from an object point a predetermined distance forwardly of said instrument entering said housing through said opening and divide and direct said light rays laterally along separate optical paths toward the reflectors carried respectively by said supporting frames, transparent means adjacent said eyepieces and said central opening for closing said housing to dust and the like, and shielding means surrounding each tubular projection and disposed between each tubular projection and the adjacent portions of the rear wall of the housing arranged to prevent the infiltration of dust or the like into said housing.

3. An optical instrument of the binocular type comprising a hollow housing formed by a main housing section and a cover section removably secured thereto, laterally extending guideways within said housing, a pair of laterally adjustable members within said housing and having end portions extending outwardly of said housing through apertures formed in opposite side wall portions thereof, said members having inner widely spaced portions arranged in slidable engagement with said guideways, an accurately formed guide slot in each of said members, guide means carried by each side wall portion and extending through and accurately fitting each of said slots for accurately guiding the member associated therewith during lateral movement thereof, spring means carried by said cover section and resiliently urging said members downwardly against said guideways, a supporting frame carried by each of said members and having a tubular projection extending rearwardly therefrom, a reflector carried by each of said supporting frames in alignment with the tubular projection carried thereby, a pair of laterally elongated openings in the rear wall of said main housing section through which said tubular projections extend, eyepieces carried by each tubular projection, a central opening in a front wall of said main housing section, reflecting means centrally disposed within said housing rearwardly of said central opening, said reflecting means being disposed in said housing so as to receive light rays from an object point a predetermined distance forwardly of said instrument entering said housing through said opening and divide and direct said light rays laterally along separate optical paths toward the reflectors carried respectively by said supporting frames, transparent means adjacent said eyepieces and said central opening for closing said housing to dust and the like, and shielding means surrounding each tubular projection and disposed between each tubular projection and the adjacent portions of the rear wall of the housing arranged to prevent the infiltration of dust or the like into said housing.

4. A device adapted to be supported by the head of a user thereof and comprising common means supporting a binocular optical instrument and an illumination system in relatively fixed operative relation to each other, said optical instrument comprising a hollow housing, a pair of laterally shiftable members carried by said housing, a supporting frame carried by each of said members and having a tubular projection extending rearwardly therefrom, a reflector carried by each of said supporting frames in alignment with the tubular projection carried thereby, a pair of laterally elongated openings in the rear wall of said housing through which said tubular projections extend, an eyepiece carried by each tubular projection, a central opening in a front wall of said housing section, light ray dividing means disposed within said housing rearwardly of said central opening, said light ray dividing means being positioned in said housing so as to receive light rays traveling from an object point spaced a predetermined distance forwardly of said instrument and entering said housing through said central opening and direct same laterally along separate optical paths toward the reflectors carried by said supporting frames, said illumination system comprising a vertcally disposed housing, a lamp and condensing means within said vertical housing and arranged to direct light downwardly therefrom as an illuminating beam focused substantially at a predetermined distance therefrom, mirror means beneath said vertical housing, pivotal means adjacent the lower end of said vertical housing normally locating said mirror means in a downwardly and forwardly extending operative position with its lower edge disposed closely adjacent the line of sight formed by the light rays traveling from said object point to said light ray dividing means, and so that said mirror means will direct said illuminating beam substantially along said line of sight and toward said object point, and releasable detent means positioned adjacent the lower end of said vertical housing and normally retaining said mirror means in its operative position, said detent means being releasable by pressure against a forward part of said mirror means for freeing said mirror means for pivotal movement.

5. A device adapted to be supported by the head of a user thereof and comprising a head gear, common means supporting a binocular optical instrument and an illumination system in relatively fixed operative relation to each other, a rigid connecting link, first pivotal clamping means connecting one end of said link to said head gear, second pivotal clamping means connecting the other end of said link to said common supporting means, said instrument comprising a hollow housing, a pair of laterally shiftable members carried by said housing, a supporting frame carried by each of said members and having a tubular projection extending rearwardly therefrom, a reflector carried by each of said supporting frames in alignment with the tubular projection carried thereby, a pair of laterally elongated openings in the rear wall of said housing through which said tubular projections extend, an eyepiece carried by each tubular projection, a central opening in a front wall of said housing section, light ray dividing means disposed within said housing rearwardly of said central opening, said light ray dividing means being positioned in said housing so as to receive and divide light rays traveling from an object point spaced a predetermined distance forwardly of said instrument and entering said housing through said central opening and direct same laterally along separate optical paths toward the reflectors carried by said supporting frames, said illumination system comprising a vertically disposed housing, a lamp and condensing means within said vertical housing and arranged to direct light downwardly therefrom as an illuminating beam focused substantially at a predetermined distance therefrom, and mirror means beneath said vertical housing and disposed in a downwardly and forwardly extending operative position with its lower edge positioned closely adjacent the line of sight formed by the light rays traveling from said object point to said light ray dividing means, and so that said mirror means will direct said illuminating beam substantially along said line of sight and toward said object point, said first and second pivotal clamping means being independently adjustable to vary the friction thereof tending to resist pivotal movement, whereby one of said pivotal means may be adjusted to properly position said eyepieces before the user's eyes and firmly clamped to prevent movement thereafter while the other pivotal means is sufficiently free to allow bodily movement of the link and instrument to a position above the user's forward vision.

6. An optical instrument in accordance with claim 1 in which said housing is provided with a removable cover section carrying spring means pressing said laterally adjustable members into engagement with the guideways in said housing.

7. An optical instrument in accordance with claim 1 in which an accommodation lens is seated in an annular recess in each eye tube, and a lens retainer has screw threaded engagement with each lens tube for retaining said accommodation lens seated.

References Cited in the file of this patent

UNITED STATES PATENTS

| Number | Name | Date |
|---|---|---|
| 963,036 | De Zeng | July 5, 1910 |
| 1,240,905 | Troppman | Sept. 25, 1917 |
| 1,688,113 | Bornkessel | Oct. 16, 1928 |
| 1,862,031 | Patterson | June 7, 1932 |
| 2,270,931 | Corcoran | Jan. 27, 1942 |
| 2,357,377 | Bausch | Sept. 5, 1944 |
| 2,436,574 | Johonson | Feb. 24, 1948 |
| 2,535,916 | Gradisar | Dec. 26, 1950 |
| 2,538,828 | Carbonara | Jan. 23, 1951 |
| 2,552,938 | Cojan | May 15, 1951 |
| 2,553,329 | Perkins | May 15, 1951 |
| 2,622,473 | Littman | Dec. 23, 1952 |